United States Patent
Fujii et al.

(10) Patent No.: US 6,644,434 B2
(45) Date of Patent: Nov. 11, 2003

(54) MOTOR-DRIVEN POWER STEERING APPARATUS

(75) Inventors: Hideaki Fujii, Gunma (JP); Masayuki Ohkubo, Gunma (JP); Yoshiaki Taniguchi, Saitama (JP); Yoshihiro Takemoto, Gunma (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 10/120,294

(22) Filed: Apr. 10, 2002

(65) Prior Publication Data
US 2002/0148676 A1 Oct. 17, 2002

(30) Foreign Application Priority Data

Apr. 11, 2001 (JP) ........................................ 2001-112683
Apr. 11, 2001 (JP) ........................................ 2001-112684

(51) Int. Cl.$^7$ ................................................ B62D 5/04
(52) U.S. Cl. .......................... 180/446; 701/41; 180/443
(58) Field of Search ................................ 180/443, 444, 180/446; 701/41, 42

(56) References Cited

U.S. PATENT DOCUMENTS

| | | | | |
|---|---|---|---|---|
| 5,668,721 A | * | 9/1997 | Chandy | 701/41 |
| 5,919,241 A | * | 7/1999 | Bolourchi et al. | 701/41 |
| 6,122,579 A | * | 9/2000 | Collier-Hallman et al. | 701/41 |
| 6,400,108 B1 | * | 6/2002 | Chen et al. | 318/439 |
| 6,407,524 B1 | * | 6/2002 | Endo et al. | 318/432 |
| 6,448,724 B1 | * | 9/2002 | Kleinau et al. | 318/254 |

FOREIGN PATENT DOCUMENTS

JP     8-251975     9/1996

* cited by examiner

Primary Examiner—Lesley D. Morris
Assistant Examiner—Tony Winner
(74) Attorney, Agent, or Firm—McCormick, Paulding & Huber LLP

(57) ABSTRACT

To provide a motor-driven power steering apparatus which can prevent the play of the handle from being generated at the time of steering and the noises from occurring at the time of a high rotation in a motor-driven power steering.

In a motor-driven power steering apparatus mounted as a steering unit for steering running wheels such as front wheels or the like of a motor vehicle, the running wheels are steering-wheel turned by a steering assist force given by a brushless motor and a manual steering force given by operation of a steering handle. In a control circuit portion of this brushless motor, in accordance with a procedure of S1 to S8, the lead angle amount is computed in accordance with a detection signal from a torque sensor, and the rotation number is computed on the basis of a detection signal from the resolver, and the brushless motor is driven at an optimum lead angle obtained by correcting a lead angle amount corresponding to the load in accordance with the rotation number, and thereby it is possible to reduce a torque ripple at the time of a low rotation and reduce an electric current ripple at the time of a high rotation.

1 Claim, 7 Drawing Sheets

POWER SOURCE CURRENT

TIME

MOTOR-DRIVEN POWER STEERING APPARATUS

REFERENCE TO PRIOR APPLICATIONS

This application is entitle to the benefit of and incorporates by reference essential subject matter disclose in Japanese Patent Application No. 2001-112683 filed Apr. 11, 2001 and Japanese Patent Application No. 2001-112684 filed Apr. 11, 2001.

BACKGROUND OF THE INVENTION

The present invention relates to a sensing technique of a motor-driven power steering apparatus for a motor vehicle, and more particularly to a technique effectively applied to a motor-driven power steering apparatus that can drive a brushless motor for a motor-driven power steering at a timing corresponding to an optimum lead angle in accordance with a load.

For example, a motor-driven power steering apparatus of a technique which the inventors of the present application have studied is mounted as a steering unit for steering running wheels such as front wheels or the like of a motor vehicle, and has employed a brushless motor by considering no change in a performance thereof even if a manner of coming in contact with a commutator of a brush is changed, long service life time, and the like. As a motor-driven power steering apparatus employing the brushless motor, there has been known a so-called rack assist type structure in which the brushless motor is coaxially provided at a rack shaft and a steering assist force is obtained by the brushless motor provided at the rack shaft.

The rack assist type motor-driven power steering apparatus comprised a brushless motor, a rack shaft coaxially provided at the brushless motor, running wheels rack-and-pinion connected to the rack shaft via a connecting mechanism, a steering handle and the like, and transmits a steering assist force generated by the brushless motor, to the rack shaft via a ball-screw mechanism. Further, the structure is made such that the running wheels are steering-wheel turned by the steering assist force generated by the brushless motor and a manual steering force generated by operation of the steering handle, and thereby it is possible to reduce a steering load of a driver (for example, Japanese Patent Laid-open No. 8-251975).

SUMMARY OF THE INVENTION

However, in the motor-driven power steering apparatus using the above-mentioned brushless motor, the brushless motor is commutated and controlled in accordance with a position detecting information of a rotor. However, since a torque ripple of the brushless motor becomes sometimes large and is transmitted to the driver via a handle shaft as the play of the handle, there is the case where a bad influence is given to a steering feeling of the driver.

Further, when commutation and control thereof is executed in accordance with the position information of the rotor, the fluctuation of a power source current (electric current ripple) becomes large, for example, as shown in FIG. 7. Due to the electric current ripple, noises are generated from the brushless motor. In particular, when the rotation number of the brushless motor is high similarly to the case of quickly turning the steering handle, the noises become significant, and thereby a sense of discomfort is given to the driver.

Accordingly, an object of the present invention is to provide a motor-driven power steering apparatus which can prevent play of a handle at the time of steering and an occurrence of noises at the time of a high rotation relative to a motor-driven power steering, by taking into consideration the torque ripple of the brushless motor mentioned above and the electric current ripple of the power source current.

The present invention, in order to achieve the object mentioned above, comprises a brushless motor for generating a steering assist force; a driving means for applying one of an electric current and no electric current to each phase coil of said brushless motor and thereby making said brushless motor rotate in a predetermined direction; a load detecting means for detecting a load applied to said brushless motor; a lead-angle-amount computing means for computing a lead angle amount in accordance with the load detected by said load detecting means; a position detecting means for detecting a position of a rotor in said brushless motor; a rotation-number computing means for computing the rotation number of said brushless motor on the basis of a detection signal of said position detecting means; a lead-angle-amount correcting means for correcting the lead angle amount computed by said lead-angle-amount computing means in accordance with the rotation number computed by said rotation-number computing means; and a control means for generating a timing signal corresponding to the lead angle amount corrected by said lead-angle-amount correcting means, controlling said driving means on the basis of the timing signal, and controlling time of one of an electric current and no electric current applied to each phase coil of said brushless motor at a commutation timing corresponding to a predetermined lead angle.

Further, another object of the present invention is to provide a motor-driven power steering apparatus which can prevent an occurrence of noises at the time of steering relative to a motor-driven power steering, by taking into consideration the electric current ripple of the power source current mentioned above.

Another aspect of the present invention, in order to achieve another object mentioned above, comprises: a brushless motor generating a steering assist force; a driving means for applying one of an electric current and no electric current to each phase coil of said brushless motor and thereby making said brushless motor rotate in a predetermined direction; a position detecting means for detecting a position of a rotor in said brushless motor; a rotation-number computing means for computing the rotation number of said brushless motor on the basis of a detection signal of said position detecting means; a lead-angle-amount computing means for computing a lead angle amount in accordance with the rotation number computed by said rotation-number computing means; and a control means for generating a timing signal corresponding to the lead angle amount computed by said lead-angle-amount computing means, controlling said driving means on the basis of the timing signal and controlling time of an electric current and no electric current applied to each phase coil of said brushless motor at a commutation timing corresponding to a predetermined lead angle.

DESCRIPTION OF THE PREFERRED EMBODIMENTS

A description will be in detail and below given of embodiments of the present invention with reference to the accompanying drawings.

(First Embodiment)

Figure 1:
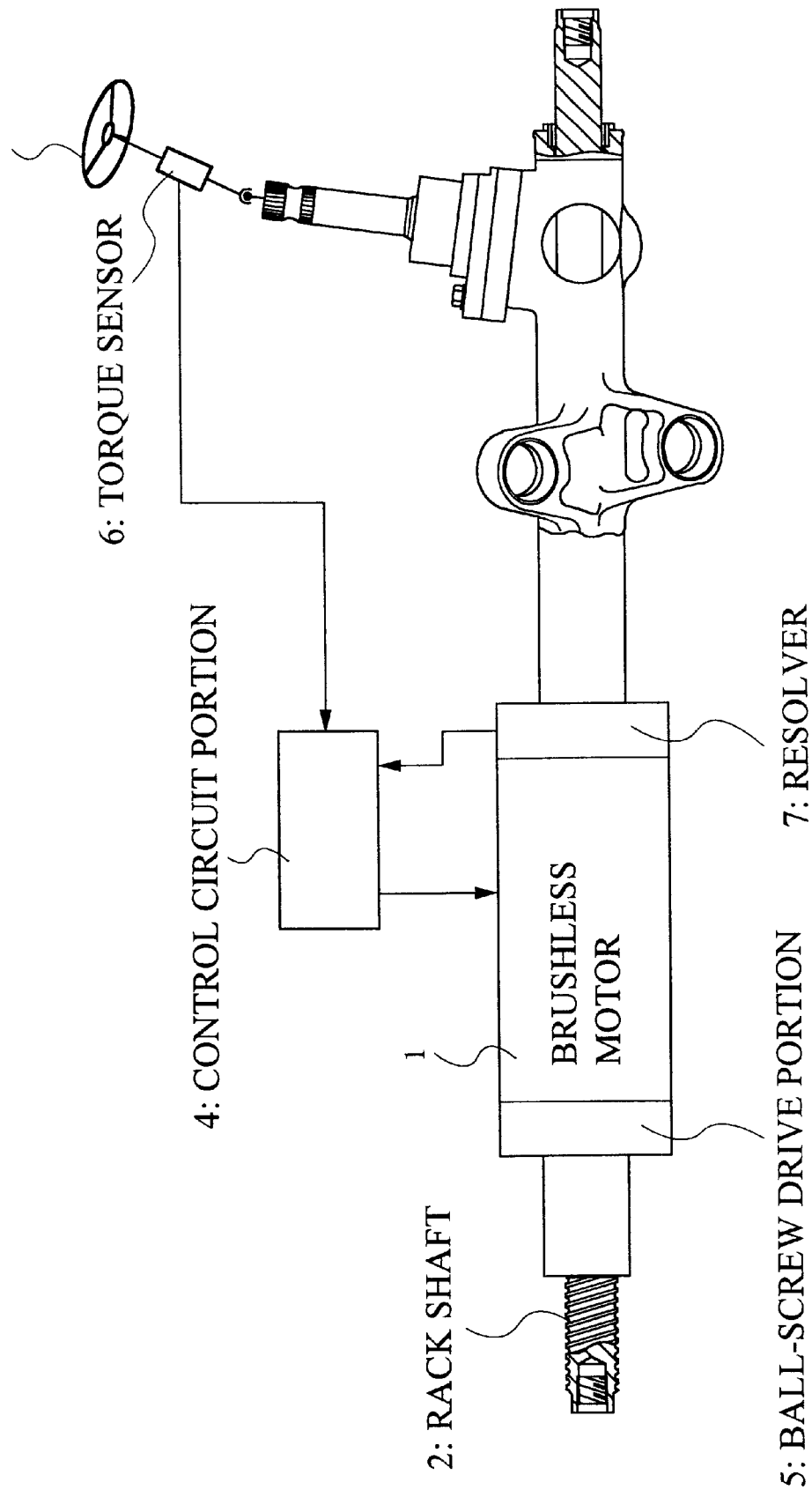
FIG. 1 is an outline view showing the structure of a main portion of a motor-driven power steering apparatus that is a first embodiment of the present invention.
Figure 2:
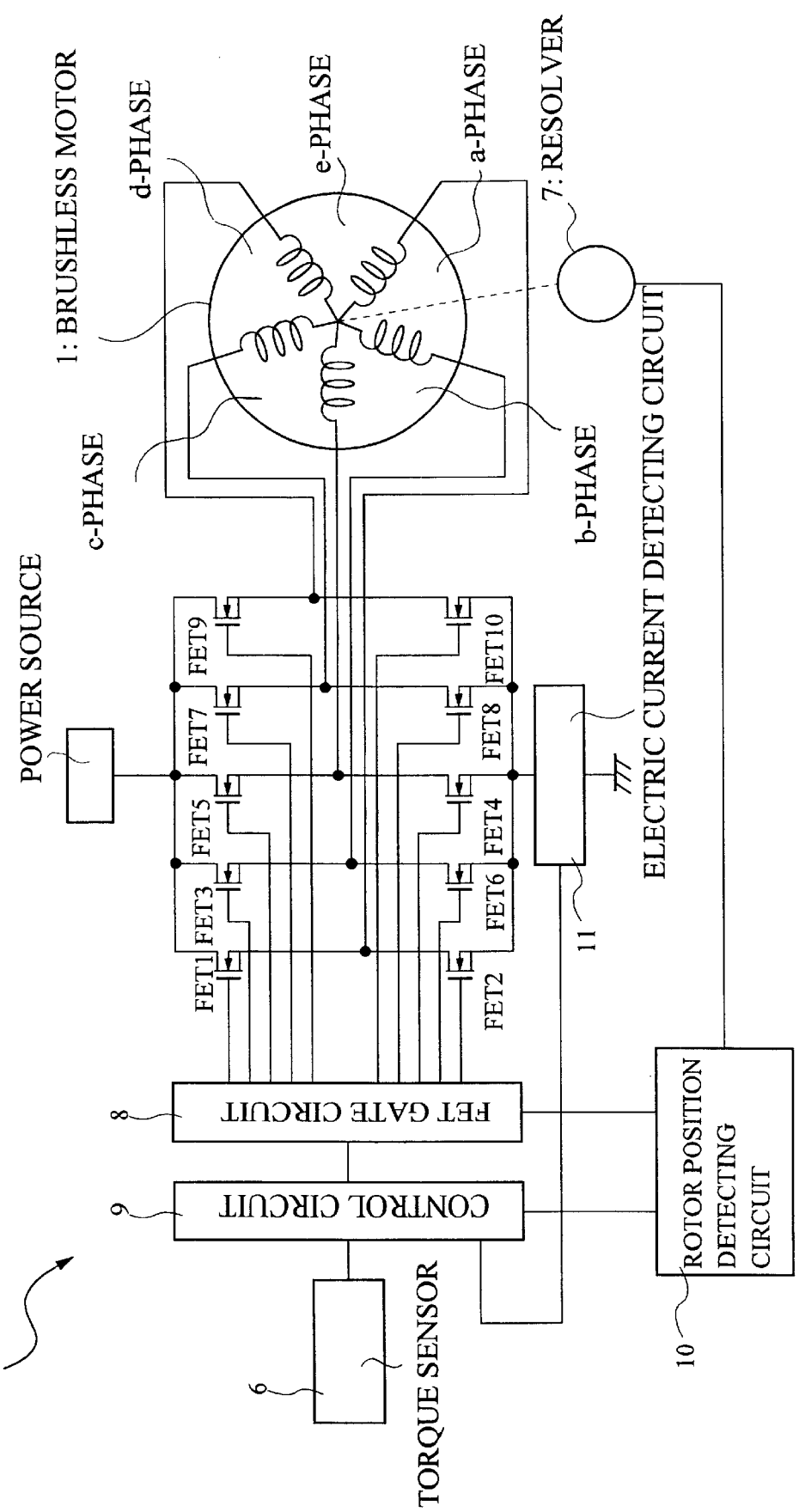
FIG. 2 is a function block diagram showing a control circuit portion of a brushless motor in the motor-driven power steering apparatus that is a first embodiment of the present invention.
Figure 3:
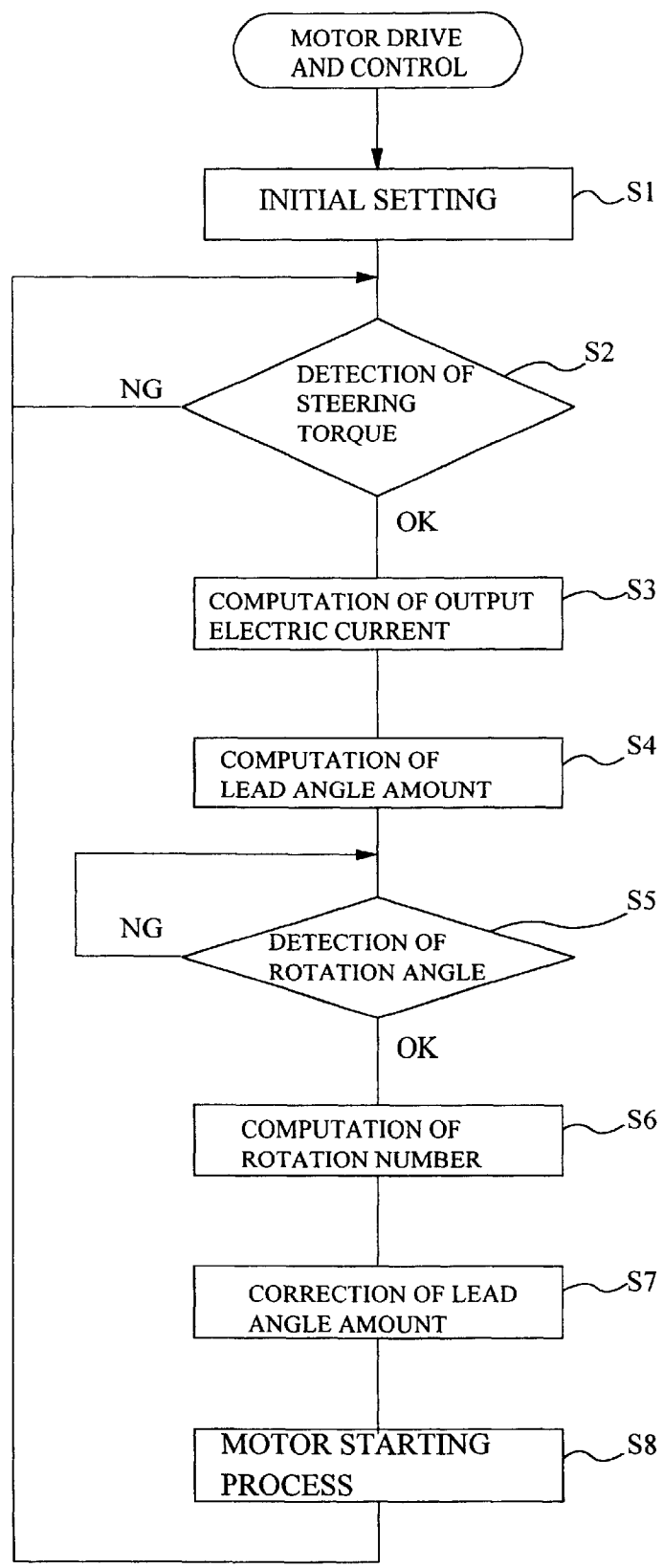
FIG. 3 is a flow chart showing a process of a control circuit portion in the motor-driven power steering apparatus that is a first embodiment of the present invention.
Figure 4:
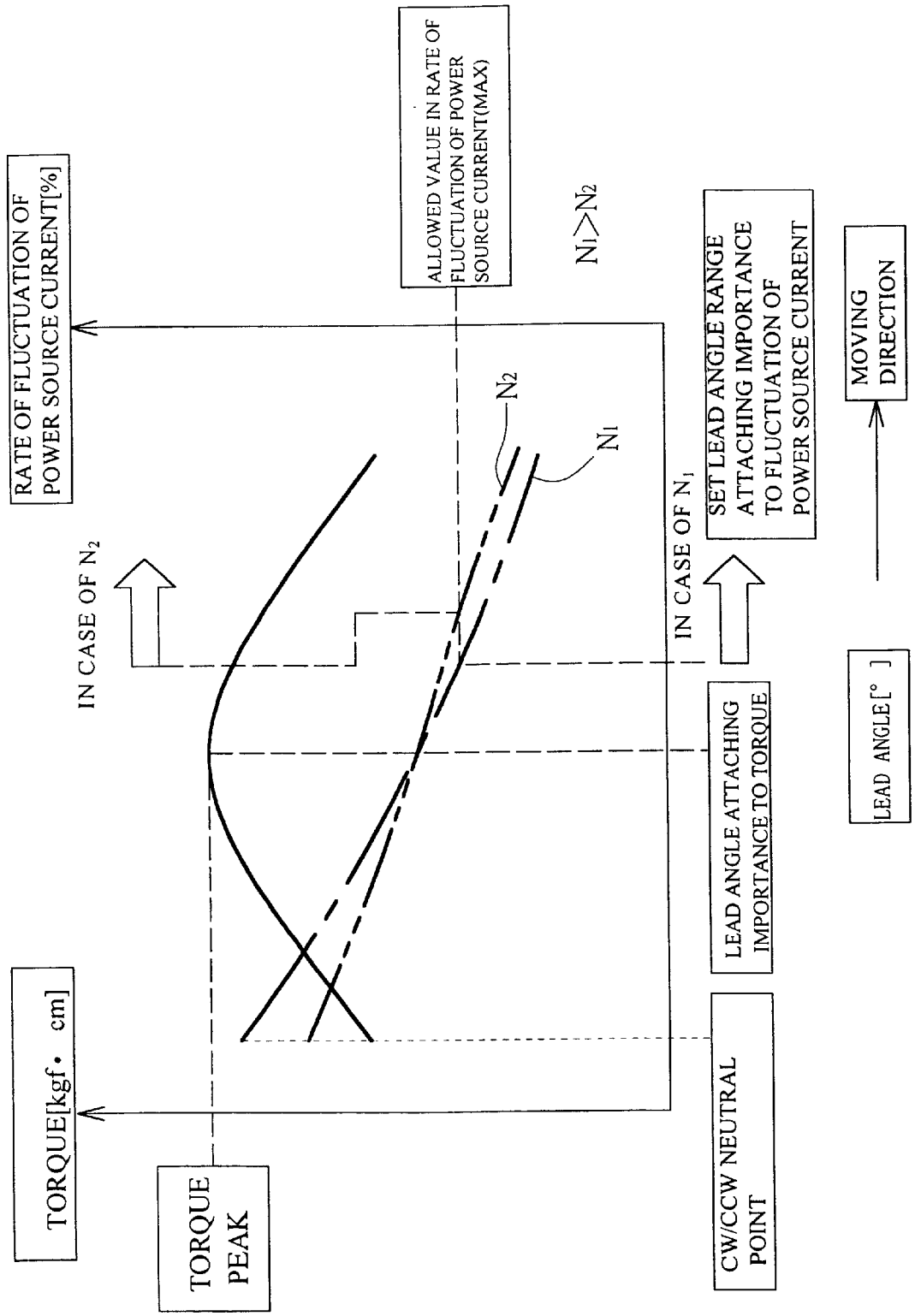
FIG. 4 is a characteristic view showing the relation between a torque and a rate of fluctuation of a power source current with respect to a lead angle in the motor-driven power steering apparatus that is a first embodiment of the present invention.
Figure 5:
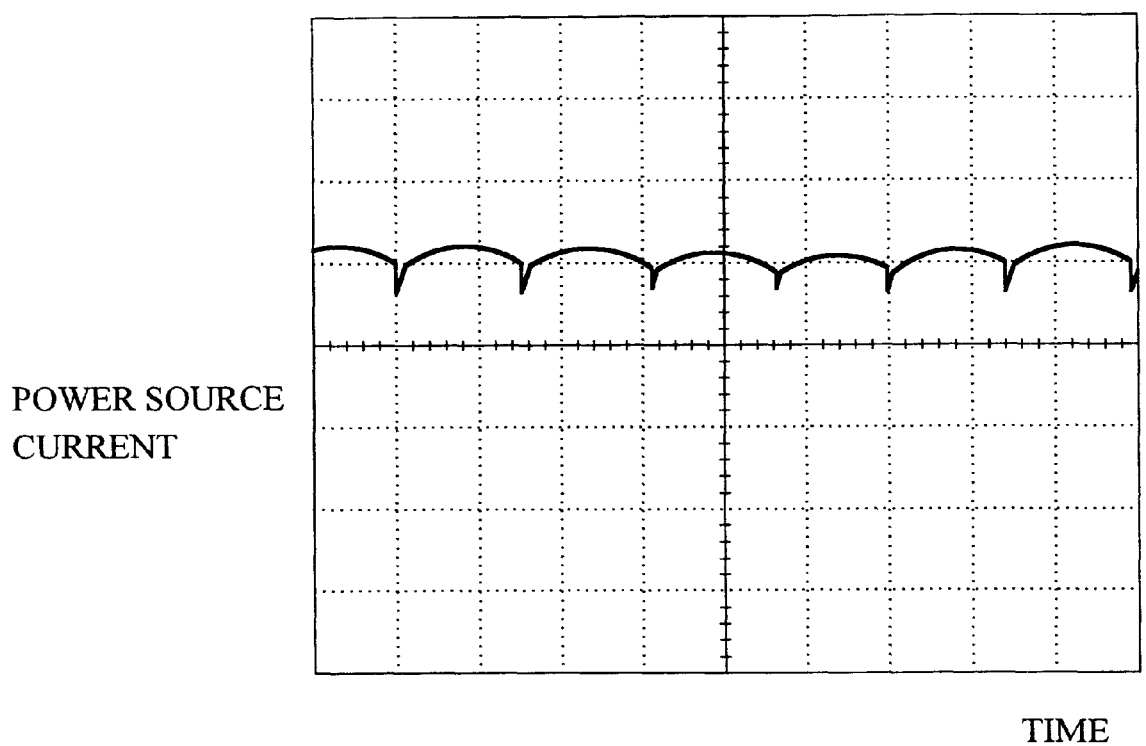
FIG. 5 is a wave form chart showing the power source current in the motor-driven power steering apparatus that is a first embodiment of the present invention.

FIG. 1 is an outline view showing the structure of a main portion of a motor-driven power steering apparatus that is a first embodiment of the present invention, FIG. 2 is a function block diagram showing a control circuit portion of a brushless motor in the motor-driven power steering apparatus that is a first embodiment of the present invention, FIG. 3 is a flow chart showing a process of a control circuit portion, FIG. 4 is a characteristic view showing the relation between a torque and a rate of fluctuation of a power source current with respect to a lead angle, and FIG. 5 is a wave form chart showing the power source current.

At first, a description will be given of an outline structure of an example of the motor-driven power steering apparatus that is a first embodiment, with reference to FIG. 1. The motor-driven power steering apparatus according to the first embodiment is mounted as a steering unit for steering running wheels such as front wheels or the like of a motor vehicle. The motor-driven power steering apparatus comprises a brushless motor 1; a rack shaft 2 coaxially provided in the brushless motor 1; running wheels (not shown) connected to both ends of the rack shaft 2 via a connecting mechanism such as a rod, an arm or the like; a steering handle 3 connected to the rack shaft 2 via a connecting mechanism such as a steering shaft or the like; a control circuit portion 4 for driving and controlling the brushless motor 1; a ball-screw drive portion 5 transmitting a steering assist force generated by the brushless motor 1 to the rack shaft 2; and the like, such that the running wheels are steering-wheel turned in accordance with the steering assist force applied by the brushless motor 1 and a manual steering force applied by operation of the steering handle 3.

The brushless motor 1 of the motor-driven power steering apparatus is controlled via the control circuit portion 4 on the basis of results of detection given by a torque sensor 6 provided between the steering handle 3 and the rack shaft 2, and a resolver 7 for detecting a position (rotation angle) of a rotor in the brushless motor 1. The brushless motor 1 is, for example, formed in an inner rotor type, in which a stator is arranged at an outer peripheral portion thereof and a rotor is provided in an inner peripheral portion thereof. Five phase coils are held in the inner peripheral portion of the stator, and a magnet is arranged in the outer peripheral portion of the rotor.

Next, a description will be given of the structure of an example of the control circuit portion 4 in the brushless motor 1 with reference to FIG. 2. The control circuit portion 4 of the brushless motor 1 has five phase coils comprising an a-phase coil, a b-phase coil, a c-phase coil, a d-phase coil and an e-phase coil which are substantially shown above, and is connected to the brushless motor 1 generating the steering assist force, the torque sensor 6 that is a load detecting means for detecting a load (steering torque) applied to the brushless motor 1, the resolver 7 that is a position detecting means for detecting the position (rotation angle) of the rotor in the brushless motor 1, and the like.

The control circuit portion 4 comprises an FET gate circuit 8 and five sets of FET1 to FET10 as a driving means for applying an electric current or no electric current to each phase coil of the brushless motor 1 and rotating the brushless motor 1 in a predetermined direction; a rotor-position detecting circuit 10 into which a detection signal from the resolver 7 is input; a control circuit 9; and the like. The control circuit 9 has a function of a lead-angle-amount computing means for computing a lead angle amount in accordance with the load detected by the torque sensor 6; a rotation-number computing means for computing the rotation number of the brushless motor 1 on the basis of the detection signal of a rotation angle of the rotor in the rotor-position detecting circuit 10; a lead-angle-amount correcting means for correcting the lead angle amount computed by the lead-angle-amount computing means in accordance with the rotation number computed by the rotation-number computing means; and a control means for generating a timing signal corresponding to the lead angle amount corrected by the lead-angle-amount correcting means, controlling the FET gate circuit 8 on the basis of the timing signal, and controlling time of an electric current or no electric current applied to each phase coil so as to have a predetermined duty at a commutation timing corresponding to a predetermined lead angle amount.

Respective gates of the five sets of FET1 to FET10 are connected to the FET gate circuit 8, and five sets of FET1 to FET10 are controlled to be ON or OFF on the basis of a drive duty and an FET switching signal. The drain of the FET1 is connected to a power source voltage, the source thereof is connected to the drain of the FET2 and the source of the FET2 is connected to an earth voltage via an electric current detecting circuit 11 and is connected to the a-phase coil in the brushless motor 1 from a connection node between the source of the FET1 and the drain of the FET2. In the same manner, the FET3 and the FET4, the FET5 and the FET6, the FET7 and the FET8, and the FET9 and the FET10 are also connected between the power source voltage and the earth voltage, and are connected to the b-phase coil, the c-phase coil, the d-phase coil and thee-phase coil in the brushless motor 1 from connection nodes, respectively. It is possible to make the brushless motor 1 rotate in a clockwise direction or a counterclockwise direction by controlling these five sets of FET1 to FET10 to be ON or OFF and controlling the electric current flowing through each phase coil at the commutation timing.

Next, with respect to operation of this first embodiment, a description will be given of operation of the control circuit portion 4 in the brushless motor 1 with reference to FIG. 3. A process in the control circuit portion 4 is executed in a software manner on the basis of a predetermined algorithm (including the functions of the lead-angle-amount computing means, the rotation-number computing means, the lead-angle-amount correcting means and the like) by the control circuit comprising a CPU.

At first, in order to execute drive and control of the brushless motor 1, an initial setting is executed (S1), and a steering torque is detected by the torque sensor 6 (S2), and thereafter this detection signal is processed in accordance with the algorithm in the control circuit 9, and an output electric current corresponding to the detected steering torque is computed (S3). Then, in the control circuit 9, a lead angle amount to be angle led of the rotor corresponding to the load is computed on the basis of the computed output electric current (S4).

Subsequently, the rotation angle of the rotor is detected by the resolver 7 connected to the brushless motor 1 (S5). Further, in the control circuit 9, the detection signal of the rotation angle is processed in accordance with the algorithm, and the rotation number is computed (S6). The computation of the rotation number can be obtained from a switching time of an angle signal of the resolver 7.

Thereafter, in the control circuit 9, the calculated lead angle amount is corrected to an optimum lead angle amount to be angle led of the rotor in accordance with the computed rotation number (S7). Further, a start process of the brushless motor 1 is executed on the basis of a timing signal corresponding to the corrected lead angle amount and an absolute angle signal of the resolver 7 (S8). After starting, the process from S2 is executed at a predetermined timing and at any time.

Accordingly, it is possible to commutate and control the FET1 to FET10 via the FET gate circuit 8 and to control time of an electric current or no electric current applied to each phase coil of the brushless coil 1, at a commutation timing corresponding to the optimum lead angle amount obtained by correcting the lead angle amount corresponding to the load in accordance with the rotation number.

For example, in the brushless motor 1 having the five phase coils, a normal commutation timing becomes 0 degree, 36 degrees, 72 degrees, 108 degrees and the like. However, in accordance with the present embodiment, for example, if the lead angle is set to 5 degrees, then the communication timing becomes 355 degrees, 31 degrees, 67 degrees, 103 degrees and the like. Accordingly, at the time when the rotation angle of the rotor obtained by the resolver 7 coincides with the previous angle of commutation, the control circuit 9 may execute commutation and control thereof to switch the FET1 to FET10.

As mentioned above, in the commutation control according to the first embodiment, the lead angle is computed on the basis of the electric current value corresponding to the load, and correction of the lead angle is executed relative to the computed value on the basis of the rotation number. That is, it is possible to prevent generation of the torque ripple and the occurrence of the noises by increasing the lead angle amount when the load electric current is large and by being corrected such that the lead angle amount is increased as the rotation number becomes higher. Accordingly, it is possible to attach importance to efficiency at the time of a low rotation and to prevent the occurrence of the noises at the time of a high rotation. However, since angle leading in increasing the rotation results in improvement of efficient of a motor, efficiency of the brushless motor is not significantly reduced.

For example, the relation between the torque to the lead angle and the rate of fluctuation of the power source current is shown in FIG. 4. A solid line shows characteristics of the torque, and a dash-single-dot line (the rotation number $N_1$) and a dash-double-dot line (the rotation number $N_2$) show characteristics of the rate of fluctuation of the power source current, respectively. As shown in FIG. 4, it is possible to obtain such a setting as to attach importance to the rate of fluctuation of the power source current, by moving the lead angle in a moving direction with respect to a lead angle amount attaching importance to the torque at the time when the torque is at peak. Further, with respect to the rotation number, in the case where the rotation number is high ($N_1$), the rate of fluctuation of the power source current is large when the lead angle amount is small, and the rate becomes small as the angle lead is executed. Meanwhile, in the case where the rotation number is low ($N_2$), since the power source current flows quickly at the start, the rate of fluctuation of the power source current does not become great. That is, in the set lead-angle-range attaching importance to the rate of fluctuation of the power source current, it is possible to prevent the generation of the torque ripple and the occurrence of the noises, by making the lead angle amount small when the rotation number is high and by making the lead angle amount large when the rotation number is low, with respect to an allowed value (MAX).

Figure 7:
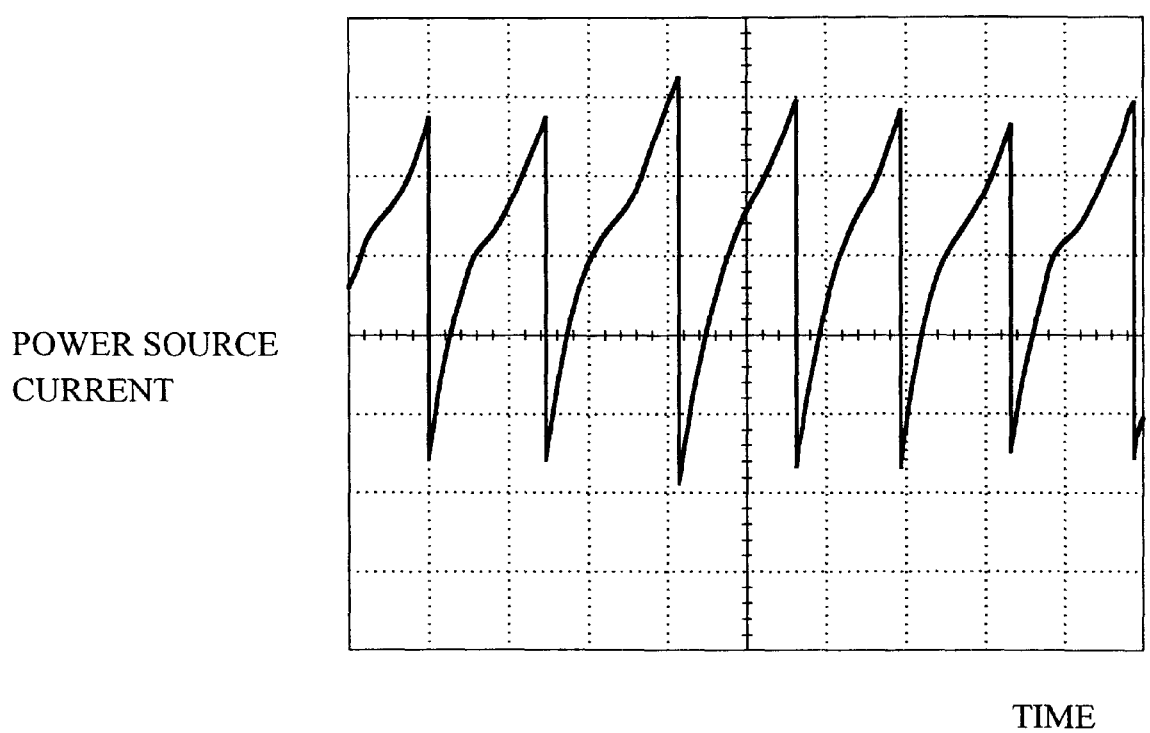
FIG. 7 is a wave form chart showing the power source current in the motor-driven power steering apparatus serving as a foundation of the present invention.

Further, in comparison with the case of executing commutation and control thereof in accordance with the position information of the rotor as shown in FIG. 7 mentioned above, for example, a wave form of the power source current as shown in FIG. 5 becomes flat, and it is possible to make the fluctuation of the power source current (electric current ripple) small. As mentioned above, since the electric current ripple becomes small, no noises are generated from the brushless motor 1 and no sense of discomfort is given to the driver.

Accordingly, this first embodiment has the torque sensor 6 for detecting the steering torque, the resolver 7 for detecting the rotation angle of the rotor, and the control circuit 9 which computes the lead angle amount in accordance with the detection signal given by the torque sensor 6, computes the rotation number on the basis of the detection signal given by the resolver 7, corrects the computed lead angle amount in accordance with the rotation number, and generates the timing signal corresponding to the corrected lead angle amount. So, the first embodiment can drive the brushless motor 1 at the optimum lead angle obtained by correcting the lead angle amount corresponding to the load in accordance with the rotation number, and to reduce the torque ripple at the time of a low rotation and to reduce the electric current ripple at the time of a high rotation, and thereby to prevent the play of the handle from being generated and the noises from occurring at the time of steering.

It goes without saying that the present invention is not limited to the embodiment mentioned above, and can be variously modified and changed without departing from the gist thereof.

According to the motor-driven power steering apparatus of the present invention, it is possible to reduce the torque ripple at the time of a low rotation and to reduce the electric current ripple at the time of a high rotation, by angle leading the commutation timing of the brushless motor, and thereby prevent the play of the handle from being generated and the noises from occurring at the time of steering.

(Second Embodiment)

Figure 6:
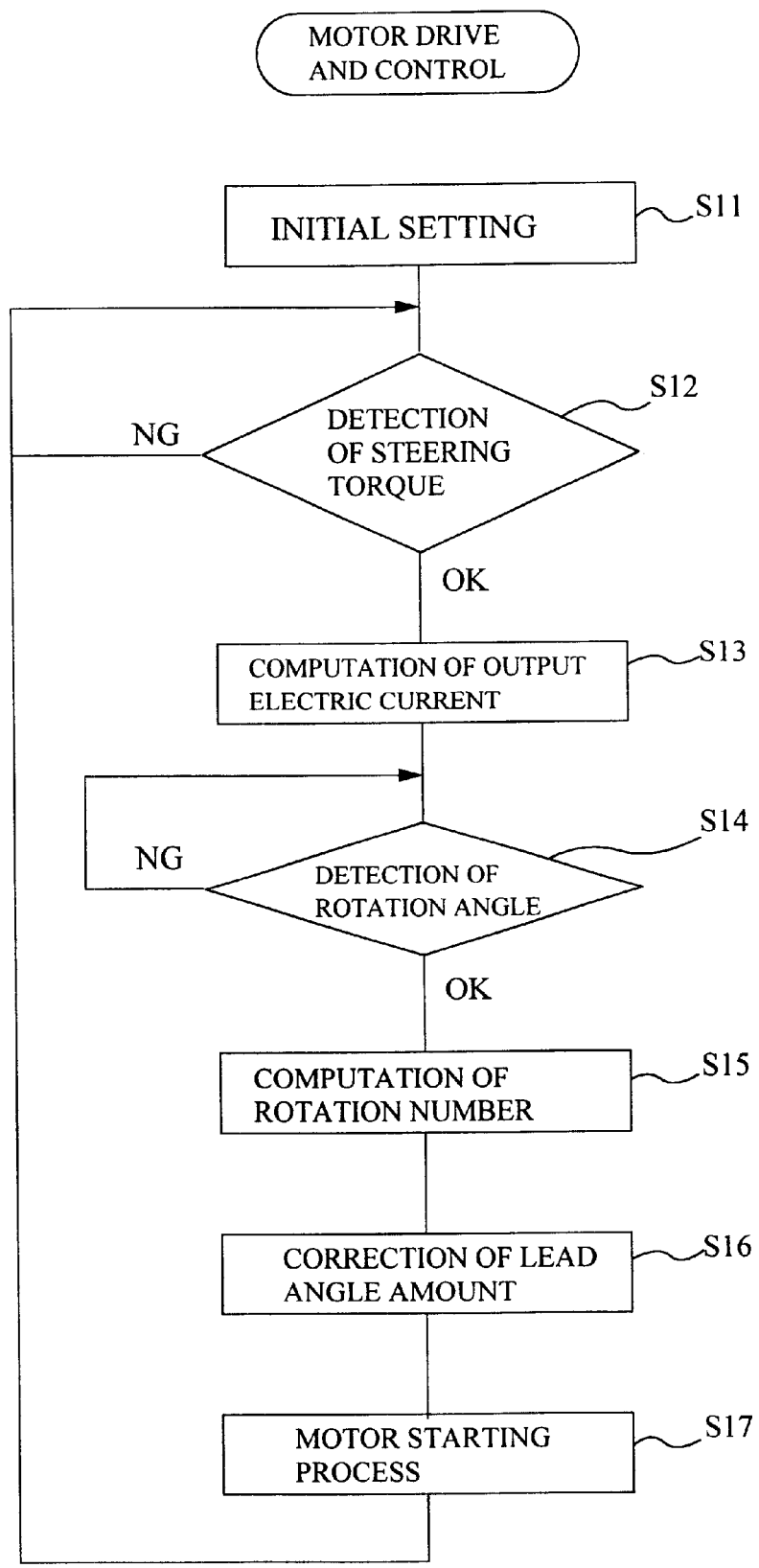
FIG. 6 is a flow chart showing a process of a control circuit portion in a motor-driven power steering apparatus that is a second embodiment of the present invention.

FIG. 6 is a flow chart showing a process of a control circuit portion in a motor-driven power steering apparatus that is a second embodiment of the present invention.

A motor-driven power steering apparatus according to a second embodiment has a structure similar to the first embodiment mentioned above (FIGS. 1 and 2), but has a control circuit with a function different from the control circuit constituting the control circuit portion shown in FIG. 2.

That is, in the motor-driven power steering apparatus according to the second embodiment, a control circuit portion 4 comprises an FET gate circuit 8 and five sets of FET1 to FET10 as a driving means for applying an electric current or no electric current to each phase coil of the brushless motor 1 and making the brushless motor 1 rotate in a predetermined direction; a rotor-position detecting circuit 10 to which a detection signal from the resolver 7 is input; a control circuit 9; and the like. The control circuit 9 has a function of a rotation-number computing means for computing the rotation number of the brushless motor 1 on the basis of the detection signal of the rotation angle of the rotor; a lead-angle-amount computing means for computing a lead angle amount in accordance with the rotation number; a control means for generating a timing signal corresponding to this lead angle amount, controlling the FET gate circuit 8 on the basis of the timing signal, and controlling time of an electric current or no electric current applied to each phase coil so as to have a predetermined duty at a commutation timing corresponding to a predetermined lead angle.

Next, with respect to operation of this second embodiment, a description will be given of operation of the control circuit portion 4 in the brushless motor 1 with reference to FIG. 6. A process in this control circuit portion 4 is executed in a software manner on the basis of a predetermined algorithm (including the functions of the rotation-number computing means, the lead-angle-amount computing means and the like) by the control circuit portion 9 comprising a CPU.

At first, in order to execute drive and control of the brushless motor 1, an initial setting is executed (S11), and a steering torque is detected by the torque sensor 6 (S12), and thereafter the detection signal is processed in accordance with the algorithm in the control circuit 9 and an output electric current corresponding to the detected steering torque is computed (S13).

Subsequently, a rotation angle of the rotor is detected by the resolver 7 connected to the brushless motor 1 (S14). Further, in the control circuit 9, the detection signal of the rotation angle is processed in accordance with the algorithm and the rotation number is computed (S15). The computation of the rotation number can be obtained from a switching time of an angle signal of the resolver 7.

Thereafter, in the control circuit 9, an optimum lead angle amount to be angle led of the rotor is computed on the basis of the computed rotation number (S16). Further, a start process of the brushless motor 1 is executed on the basis of the timing signal corresponding to the computed lead angle amount and to the absolute angle signal of the resolver 7 (S17). After starting, the process from S12 is executed at a predetermined timing and at any time.

Accordingly, it is possible to commutate and control the FET1 to FET10 via the FET gate circuit 8 and it is possible to control of an electric current or no electric current applied to each phase coil of the brushless coil 1, at a commutation timing corresponding to the optimum lead angle in accordance with the rotation number.

For example, in the brushless motor 1 having the five phase coils, a normal commutation timing becomes 0 degree, 36 degrees, 72 degrees, 108 degrees and the like. However, in accordance with the present embodiment, for example, if the angle lead is set at 5 degrees, then the communication timing becomes 355 degrees, 31 degrees, 67 degrees, 103 degrees and the like. Accordingly, at the time when the rotation angle of the rotor obtained by the resolver 7 coincides with the previous angle of commutation, the control circuit 9 may execute commutation and control thereof to switch the FET1 to FET10.

In accordance with commutation and control mentioned above, the lead angle amount is made large together with increase in the rotation number, and so efficiency of the brushless motor 1 is not lowered and the noises can be prevented from occurring. That is, in the case where the rotation number is low, the angle lead is applied too much if the lead angle amount is set to be large, and in the area in which the noises are originally generated at a low rate, it is preferable that the lead angle amount is small. On the contrary, in the case where the rotation number is high, the noises can be prevented from occurring by increasing the lead angle amount, and the efficiency of the brushless motor 1 cannot be reduced even by increasing the lead angle amount.

Therefore, in comparison with the case of executing commutation and control thereof in accordance with the position information of the rotor as shown in FIG. 7 mentioned above, for example, a wave form of the power source current becomes flat as shown in FIG. 5, and the fluctuation of the power source current (electric current ripple) can be made small. As mentioned above, since the electric current ripple becomes small, no noises are generated from the brushless motor 1 and no sense of discomfort is given to the driver.

Accordingly, the second embodiment has the resolver 7 for detecting the rotation angle of the rotor, and the control circuit 9 for computing the rotation number on the basis of the detection signal given by the resolver 7, computing the optimum lead angle amount in accordance with this rotation number, and generating the timing signal corresponding to the lead angle amount. So the second embodiment can drive the brushless motor 1 at the optimum lead angle amount in accordance with the rotation number, and thereby reduce the electric current ripple and reduce the noises generated from the brushless motor 1.

It goes without saying that the present invention is not limited to the embodiment mentioned above, and can be variously modified and changed without departing from the gist thereof.

According to another motor-driven power steering apparatus of the present invention, it is possible to reduce the electric current ripple by angle leading the commutation timing of the brushless motor in accordance with the rotation number, and thereby to prevent the noises from being generated from the brushless motor.

What is claimed is:

1. A motor-driven power steering apparatus comprising:

a brushless motor for generating a steering assist force;

a driving means for applying one of an electric current and no electric current to each phase coil of said brushless motor and thereby making said brushless motor rotate in a predetermined direction;

a load detecting means for detecting a load applied to said brushless motor;

a lead-angle-amount computing means for computing a lead angle amount in accordance with the load detected by said load detecting means;

a position detecting means for detecting a position of a rotor in said brushless motor;

a rotation-number computing means for computing the rotation number of said brushless motor on the basis of a detection signal of said position detecting means;

a lead-angle-amount correcting means for correcting the lead angle amount computed by said lead-angle-amount computing means in accordance with the rotation number computed by said rotation-number computing means; and a control means for generating a timing signal corresponding to the lead angle amount corrected by said lead-angle-amount correcting means, controlling said driving means on the basis of the timing signal, and controlling time of one of an electric current and no electric current applied to each phase coil of said brushless motor at a commutation timing corresponding to a predetermined lead angle.

* * * * *